(12) United States Patent
Blücher et al.

(10) Patent No.: US 8,709,970 B2
(45) Date of Patent: Apr. 29, 2014

(54) ADSORPTIVE MOLDED PARTS AND THE USE THEREOF

(76) Inventors: Hasso von Blücher, Erkrath (DE);
Bertram Böhringer, Wuppertal (DE);
Sven Fichtner, Brandenburg (DE);
Jann-Michael Giebelhausen, Rathenow (DE)

( * ) Notice: Subject to any disclaimer, the term of this patent is extended or adjusted under 35 U.S.C. 154(b) by 92 days.

(21) Appl. No.: 13/129,151

(22) PCT Filed: Sep. 14, 2009

(86) PCT No.: PCT/EP2009/006635
§ 371 (c)(1),
(2), (4) Date: May 13, 2011

(87) PCT Pub. No.: WO2010/054714
PCT Pub. Date: May 20, 2010

(65) Prior Publication Data
US 2011/0237424 A1    Sep. 29, 2011

(30) Foreign Application Priority Data

Nov. 14, 2008 (DE) .......................... 10 2008 057 475
Nov. 15, 2008 (DE) .......................... 10 2008 057 509
Nov. 19, 2008 (DE) .......................... 10 2008 058 248

(51) Int. Cl.
*B01J 20/26* (2006.01)

(52) U.S. Cl.
USPC ............................ 502/402; 523/200; 523/205

(58) Field of Classification Search
USPC .................................... 523/200, 205; 502/402
See application file for complete search history.

(56) References Cited

U.S. PATENT DOCUMENTS

| 3,474,600 | A | 10/1969 | Tobias |
| 5,033,465 | A | 7/1991 | Braun et al. |
| 6,083,439 | A | 7/2000 | Nastke et al. |
| 7,293,661 | B2 * | 11/2007 | Saaski et al. ................... 210/504 |
| 2003/0080473 | A1 | 5/2003 | Kelly et al. |
| 2007/0222101 | A1 * | 9/2007 | Stouffer et al. ............... 264/109 |
| 2012/0010070 | A1 * | 1/2012 | Blucher et al. ................... 502/62 |

FOREIGN PATENT DOCUMENTS

DE    69318301    11/1998

\* cited by examiner

*Primary Examiner* — Vickey Nerangis
(74) *Attorney, Agent, or Firm* — Brannon Sowers & Cracraft PC

(57) ABSTRACT

The invention relates to an adsorptive molded part preferably formed as a monolithic or single-piece part, wherein the molded part is constructed of a plurality of adsorptive structures based on agglomerates of adsorber particles, and to a method for producing said molded part and to the use thereof.

20 Claims, 8 Drawing Sheets

ADSORPTIVE MOLDED PARTS AND THE USE THEREOF

CROSS-REFERENCES TO RELATED APPLICATIONS

This application is a National Stage filing of International Application POT/EP 2009/006635, filed Sep. 14, 2009, entitled "ADSORPTIVE MOLDED PARTS AND THE USE THEREOF" claiming priority to German Applications DE 10 2008 057 475.9, filed Nov. 14, 2008; DE 10 2008 057 509.7 filed Nov. 15, 2008; and DE 10 2008 058 248.4 filed Nov. 19, 2008. The subject application claims priority to PCT/EP 2009/006635, and to German Applications No. DE 10 2008 057 475.9; DE 10 2008 057 509.7; and DE 10 2008 058 248.4, and incorporates all by reference herein, in their entirety.

BACKGROUND OF THE INVENTION

The present invention relates to the field of adsorption filter technology.

The present invention more particularly relates to adsorptive molded parts obtainable particularly from adsorptive structures based on agglomerates of adsorbent particles, and to a process for their production and their use.

The present invention further relates to filters comprising the adsorptive molded parts of the present invention.

To clean or purify fluidic media, more particularly gases, gas streams or gas mixtures, such as air for example, or alternatively liquids, such as water for example, particulate systems based on particles with specific activity (e.g., adsorbents, ion exchangers, catalysts, etc) are often used.

For instance, the use of adsorbent particles to remove toxic or noxiant substances and odors from gas or air streams or else from liquids is known from the prior art.

The use of loose beds of the aforementioned particles, particularly in she form of loose granular-bed filters, is the central form whereby the particles concerned, such as adsorbent particles for example, are brought into contact with the gas or liquid concerned.

Since small particles, such as adsorbent particles for example, provide a larger surface area than larger particles, efficiency is, not unexpectedly, better with the comparatively small particles. However, the small particles in a loose bed lead to a high pressure drop and, what is more, promote the formation of channels, which entails a certain risk of breakthrough. Therefore, the particle size used in loose beds is often but a compromise, meaning that usually the particle sizes optimal for the particular application cannot be used. More particularly, the need to achieve economical operating conditions, more particularly an acceptable pressure drop, often means that larger particles (e.g., adsorbent particles) come to be used than would be desirable for optimal utilization of the adsorption efficiency, so that it is often the case that a considerable portion of the theoretically available capacity cannot be used.

DE 38 13 564 A1 and the same patent family's EP 0 338 551 A2 disclose an activated carbon filter layer for gasmasks which comprises a highly air-pervious, substantially shape-stable three-dimensional supporting scaffold whereto a layer of granular, more particularly spherical activated carbon particles from 0.1 to 1 mm in diameter is fixed, wherein the supporting scaffold can be a braided structure formed of wires, monofilaments or struts, or be a large-pore reticulated polyurethane foam. One disadvantage with the system described therein is the fact that it requires an additional supporting material which has to be endowed with the particles in question in a relatively costly and inconvenient operation. In addition, the particular choice of supporting scaffold then restricts the use in question.

DE 42 39 520 A1 discloses a high-performance filter which consists of a three-dimensional supporting scaffold whereto adsorbent particles are fixed via a bonding material, wherein the supporting scaffold is sheathed with a thermally stable and very hydrolysis-resistant plastic which amounts to about 20 to 500%, based on the scaffold. More particularly, the supporting scaffold comprises a large-pore reticulated polyurethane foam sheathed with a silicone resin, polypropylene, hydrolysis-resistant polyurethane, an acrylate, a synthetic rubber or fluoropolymers. The manufacturing process for these structures is relatively costly and inconvenient. In addition, the technology described therein requires the presence of an additional supporting structure.

DE 43 43 358 A1 discloses porous bodies comprising activated carbon which consist of plates and agglomerates formed from ground activated carbon incorporated in a porous $SiO_2$ matrix. What is more particularly described therein are porous plates or bodies having adsorbing properties, wherein activated carbon granules or activated carbon spherules, and/or granules or spherules comprising activated carbon, are adhered together by means of a silicate solution and subsequently the silicate bridges are converted into silica gel bridges and the bodies are dried. One disadvantage with this is the fixed geometry of these porous bodies and also their lack of flexibility and compressibility, making them unsuitable for filtering conditions under mechanical loading. A further disadvantage is that the particles comprising activated carbon are completely wetted with the silicate solution, so that a large portion of the capacity of these particles is no longer available for adsorptive processes.

DE 43 31 586 02 discloses activated carbon agglomerates wherein activated carbon particles between 0.1 to 5 mm in diameter are disposed and adhered around an approximately equal-sized particle of pitch by slight pressure and heating and thereafter the pitch particle is rendered infusible and converted into activated carbon by oxidation, so that the free interspace between the particles in the agglomerate has a width amounting to at least 10% by volume of the particle size. One disadvantage with the particles described therein is the relatively costly, high-energy production process and also the incompressibility of the agglomerates obtained. Owing to the rigidity of the activated carbon agglomerates, no use is contemplated for filter applications under mechanical loading. The lack of compressibility also means that further processing into molded parts by compression molding is not possible.

The same applies to the porous bodies having adsorbing properties as per DE 42 38 142 A1, which comprise adsorbent particles which are interconnected via bridges of inorganic material, more particularly argillaceous earth, wherein the void spaces between the adsorbent particles comprise from 10 to 100% of the volume of the adsorbent particles. Again, the porous bodies described therein have but little flexibility and compressibility, foreclosing any use under mechanical loading and any further processing into molded parts by compression molding.

BRIEF SUMMARY OF THE INVENTION

The problem addressed by the present invention is therefore that of providing adsorptive molded parts which at least largely avoid or alternatively at least ameliorate the above described disadvantages of the prior art.

One particular problem addressed by the present invention is that of providing adsorptive molded parts which avoid or at least ameliorate the disadvantages of conventional granular bed filters based on individual particles, and also more particularly allow use under mechanical loading, more particularly have sufficient flexibility and/or compressibility.

The problem as defined above is solved as proposed—in accordance with a first aspect of the present invention—by the subject matter disclosed herein, which relates to an adsorptive molded part according to the present invention; further, advantageous developments and embodifications of this aspect of the present invention are further provided.

The present invention further provides—in accordance with a second aspect of the present invention—the process for producing this adsorptive molded part according to the present invention and as defined herein; further, advantageous developments and embodifications of this aspect of the present invention are further provided.

The present invention further provides—in accordance with a third aspect of the present invention—the present invention use of the adsorptive molded parts according to the present invention and as defined herein.

The present invention finally provides—in accordance with a fourth aspect of the present invention—a present invention filter as described herein, which comprises an adsorptive molded part according to the present invention; further, advantageous developments and embodifications of this aspect of the present invention are further provided.

It will be readily understood that embodifications, embodiments, advantages and the like as recited hereinbelow in respect of one aspect of the present invention only for the avoidance of repetition, self-evidently also apply mutatis mutandis to the other aspects of the present invention.

It will further be readily understood that ranges recited hereinbelow for value, number and range recitations are not be construed as a person skilled in the art will appreciate that in a particular case or for particular use departures from the recited ranges and particulars are possible without leaving the realm of the present invention.

Having made that clear, the present invention will now be more particularly described.

DETAILED DESCRIPTION OF THE INVENTION

Figure 1:
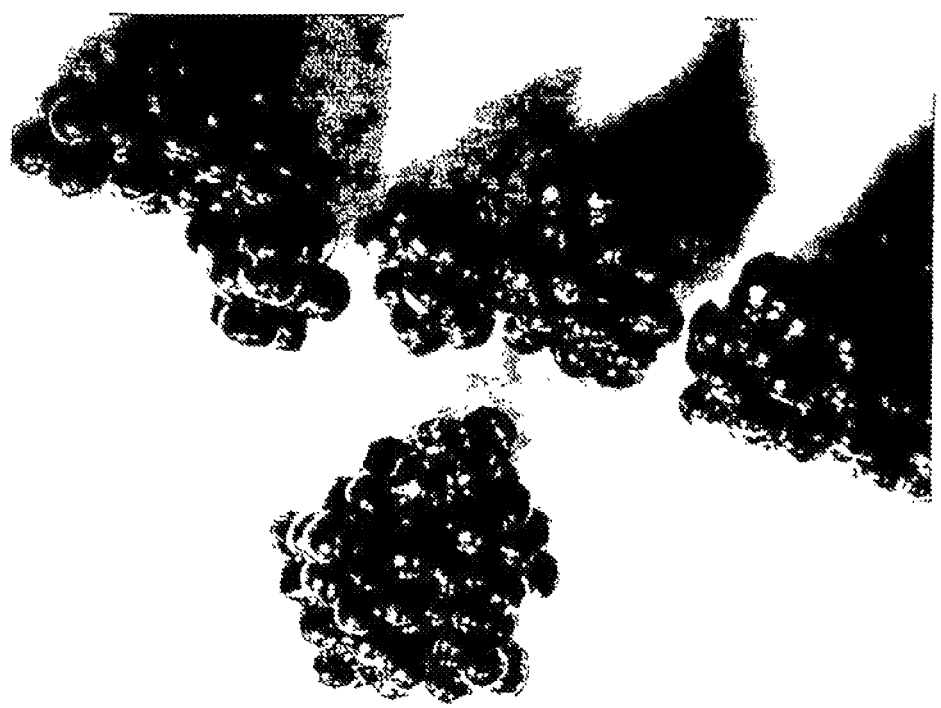
FIG. 1 provides a magnified photographic illustration of adsorptive structures which are based on agglomerates of adsorbent particles and which are used according to the present invention.

The present invention accordingly provides—in accordance with a first aspect of the present invention—an adsorptive molded part constructed from a multiplicity of adsorptive structures based on agglomerates of adsorbent particles (i.e., from a multiplicity of agglomerates of adsorbent particles).

The adsorptive molded part of the present invention comprises a multiplicity of granular, preferably spherical adsorbent particles. The adsorbent particles therein may be at least partly bound together via a preferably thermoplastic organic polymer, more particularly binder, and/or the adsorbent particles may be at least partly bound and/or adhered to a preferably thermoplastic organic polymer, more particularly binder.

Preferably, the adsorptive molded part of the present invention is in one-piece and/or monolithic form.

The adsorptive molded part according to the present invention may otherwise have any desired geometric and/or three-dimensional forms. For instance, the adsorptive molded part of the present invention may be in cylindrical, rod-shaped, plate-shaped, cube-shaped, polyhedral or the like form.

The adsorptive molded part of the present invention has an excellent pressure drop. More particularly, the adsorptive molded part of the present invention has a length-based pressure drop at a flow rate of 0.2 m/s of at most 200 Pa/cm, more particularly at most 150 Pa/cm, preferably at most 100 Pa/cm, more preferably at most 90 Pa/cm, even more preferably at most 70 Pa/cm and yet even more preferably at most 50 Pa/cm.

Typically, the adsorptive molded part of the present invention has a length-based pressure drop at a flow rate of 0.2 m/s in the range from 5 to 200 Pa/cm, more particularly in the range from 5 to 150 Pa/cm, preferably in the range from 5 to 100 Pa/cm, more preferably in the range from 7.5 to 90 Pa/cm and even more preferably in the range from 10 to 80 Pa/cm.

The adsorptive molded part of the present invention is more particularly obtainable from adsorptive structures based on agglomerates of adsorbent particles (i.e., from adsorbent particle agglomerates), more particularly as described above and as more particularly defined hereinbelow, more particularly by compression molding these adsorptive structures and/or adsorbent particle agglomerates.

The individual adsorbent particle agglomerates forming the basis for the adsorptive structures used according to the present invention to produce the adsorptive molded part according to the present invention each comprise a multiplicity of granular, preferably spherical adsorbent particles. The adsorptive structures are characterized more particularly in that the adsorbent particles of an individual agglomerate are bound together via a preferably thermoplastic organic polymer, more particularly binder, and/or in that the adsorbent particles of an individual agglomerate are bound and/or adhered to a preferably thermoplastic organic polymer, more particularly binder.

The term "agglomerates" as used in the realm of the present invention is to be understood as having a very broad meaning, and more particularly designates a more or less consolidated/conjoined accumulation of previously loose constituents (i.e., individual adsorbent particles=base particles) to form a more or less firm ensemble. The term "agglomerates" in the realm of the present invention designates so to speak technically produced conglomerations/accumulations of individual adsorbent particles which are conjoined together in the present case by an organic polymer.

The term "multiplicity of adsorbent particles" is to be understood in the realm of the present invention as meaning more particularly at least two and preferably more than two adsorbent particles.

In general, the organic polymer in the adsorptive structures used according to the present invention forms at least one core of the particular agglomerate.

More particularly, the adsorbent particles of an individual agglomerate are each disposed and/or lodged at one or more core of organic polymer, more particularly binder. The individual agglomerates may each comprise one or alternatively more cores of organic polymer, more particularly binder.

The size of the core of organic polymer, more particularly binder, can vary within wide limits.

More particularly, the core of organic polymer, more particularly binder, in the adsorptive structures used according to the present invention is from 100 to 2000 µm, more particularly from 150 to 1500 µm and preferably from 200 to 1000 µm in size.

Typically, the size ratio of core of organic polymer, more particularly binder, to individual adsorbent particle may be at least 1:1, more particularly at least 1.25:1, preferably at least 1.5:1, more preferably at least 2:1 and even more preferably at least 3:1.

To ensure good adsorption efficiency, more particularly adsorption kinetics and adsorption capacity, the individual agglomerates each generally contain at least 5 adsorbent particles, more particularly at least 10 adsorbent particles, preferably at least 15 adsorbent particles and more preferably at least 20 adsorbent particles. The individual agglomerates may each comprise up to 50 adsorbent particles, more particularly up to 75 adsorbent particles and preferably up to 100 adsorbent particles or more.

The weight ratio of adsorbent particles to organic polymer in the individual agglomerates and thus in the present invention adsorptive molded part as such can similarly vary within wide limits. In general, the individual agglomerates each have a weight ratio of adsorbent particles to organic polymer per agglomerate of at least 2:1, more particularly at least 3:1, preferably at least 5:1, more preferably at least 7:1 and even more preferably at least 8:1. The individual agglomerates typically each have a weight ratio of adsorbent particles to organic polymer per agglomerate in the range from 2:1 to 30:1, more particularly in the range from 3:1 to 20:1, preferably in the range from 4:1 to 15:1 and more preferably in the range from 5:1 to 10:1. The aforementioned lower limits are explained by the fact that a sufficient number or quantity of adsorbent particles has to be present to ensure sufficient adsorption efficiency, whereas the aforementioned upper limits are occasioned by the need for the presence of a sufficient amount of organic polymer to ensure a stable ensemble agglomerate.

In general, the individual agglomerates of the adsorptive structures used according to the present invention are in self-supporting form. This has the advantage that no additional support is required.

In general, the individual agglomerates of the adsorptive structures used according to the present invention are in particulate form. The particle sizes of the individual agglomerates can vary within wide limits. More particularly, the individual agglomerates of the adsorptive structures used according to the present invention may have particle sizes, more particularly particle diameters, in the range from 0.01 to 20 mm, more particularly in the range from 0.05 to 15 mm, preferably in the range from 0.1 to 10 mm, more preferably in the range from 0.2 to 7.5 mm and even more preferably in the range from 0.5 to 5 mm. The aforementioned particle size particulars are absolute particle sizes.

Typically, the individual agglomerates of the adsorptive structures used according to the present invention each have a raspberry- or blackberrylike structure. Individual outer adsorbent particles are disposed about one or more inner cores of organic polymer.

Advantageously, the organic polymer used is in thermoplastic form. Typically, the organic polymer is further in heat-tacky form. Preferably, the organic polymer is selected from polymers from the group of polyesters, polyamides, polyethers, polyetheresters and/or polyurethanes and also their mixtures and copolymers.

The organic polymer preferably comprises a preferably thermoplastic binder, more particularly a preferably thermoplastic adhesive, preferably based on polymers from the group of polyesters, polyamides, polyethers, polyetheresters and/or polyurethanes and also their mixtures and copolymers.

The organic polymer, more particularly the binder, preferably the hot-melt adhesive, is typically solid at 25° C. and atmospheric pressure.

Typically, the organic polymer, more particularly the binder, preferably the hot-melt adhesive, has a melting or softening range above 100° C., preferably above 110° C. and more particularly above 120° C. In general, the organic polymer, more particularly the binder, preferably the hoc-melt adhesive, has a thermal stability temperature of at least 100° C., preferably at least 125° C. and more particularly at least 150° C.

To ensure good adsorption efficiency, more particularly adsorption kinetics and/or adsorption capacity, it is advantageous for the adsorbent particles of the individual agglomerates to be covered and/or coated with organic polymer to at most 50%, more particularly to at most 40%, preferably to at most 30% and more preferably to at most 20% of their surface. A certain degree of coverage of the surface is required, however, to ensure good adherence of the adsorbent particles to the organic polymer.

The adsorbent particles typically have a porous structure. The adsorbent particles, as mentioned, are further in granular, more particularly spherical, form. This provides a very high surface area for adsorption and ensures good mechanical loadability and also good fixability/adherability.

The particle sizes of the adsorbent particles can similarly vary within wide limits. Typically, the adsorbent particles have absolute particle sizes, more particularly absolute particle diameters, in the range from 0.001 to 3 mm, more particularly in the range from 0.005 to 2.5 mm, preferably in the range from 0.01 to 2 mm, more preferably in the range from 0.02 to 1.5 mm and even more preferably in the range from 0.05 to 1 mm.

The median particle sizes of the adsorbent particles can similarly vary within wide limits. Generally, the adsorbent particles have median particle sizes, more particularly median particle diameters (D50), in the range from 0.01 to 2 mm, more particularly in the range from 0.05 to 1.5 mm and preferably in the range from 0.1 to 1 mm.

The adsorbent particles may consist of a material selected from the group of activated carbon; zeolites; inorganic oxides, more particularly silicon dioxides, silica gels and aluminum oxides; molecular sieves; mineral granulates; klathrates; metal-organic framework materials (MOFs) and also their mixtures. Activated carbon is particularly preferred.

In a particularly preferred embodiment, the adsorbent particles are formed from granular, more particularly spherical, activated carbon.

To ensure good adsorption efficiency, it is of advantage for the adsorbent particles used according to the present invention to have a specific surface area (BET surface area) of at least 500 m$^2$/g, more particularly at least 750 m$^2$/g, preferably at least 1000 m$^2$/g and more preferably at least 1200 m$^2$/g. Typically, the adsorbent particles have a specific surface area (BET surface area) in the range from 500 to 4000 m$^2$/g, more particularly in the range from 750 to 3000 m$^2$/g, preferably in the range from 900 to 2500 m$^2$/g and more preferably in the range from 950 to 2000 m$^2$/g.

The adsorbent particles used according to the present invention should further possess good mechanical loadability. Typically the adsorbent particles, more particularly the activated carbon particles, preferably the activated carbon granules or activated carbon spherules, have a bursting pressure of at least 5 newtons, more particularly a bursting pressure in the range from 5 newtons to 50 newtons, per particle.

To ensure good adsorption efficiencies, the adsorbent particles used should further have high adsorption volumes, high Gurvich total pore volumes, high total porosities and also high specific total pore volumes.

Typically, the adsorbent particles used according to the present invention have an adsorption volume $V_{ads}$ of at least 250 cm/g, more particularly at least 300 cm$^3$/g, preferably at least 350 cm$^3$/g and more preferably at least 400 cm/g. The adsorbent particles used according to the present invention typically have an adsorption volume $V_{ads}$ in the range from 250 to 3000 cm$^3$/g, more particularly in the range from 300 to 2000 cm$^3$/g and preferably in the range from 350 to 2500 cm$^3$/g.

The adsorbent particles used according to the present invention typically further have a Gurvich total pore volume of at least 0.50 cm$^3$/g, more particularly at least 55 cm$^3$/g, preferably at least 0.60 cm$^3$/g, more preferably at least 0.65 cm$^3$/g and even more preferably at least 0.70 cm$^3$/g. The adsorbent particles used according to the present invention typically have a Gurvich total pore volume in the range from 0.50 to 2.0 cm$^3$/g, more particularly in the range from 0.55 to 1.5 m$^3$/g, preferably in the range from 0.60 to 1.2 cm$^3$/g and more preferably in the range from 0.65 to 1.0 cm$^3$/g.

The adsorbent particles used according to the present invention further have a high total porosity. Typically, the adsorbent particles have a total porosity in the range from 10% to 80%, more particularly in the range from 20% to 75% and preferably in the range from 25% to 70%.

Finally, the adsorbent particles used according to the present invention have a high specific total pore volume. The adsorbent particles typically have a specific total pore volume in the range from 0.01 to 4.0 cm$^3$/g, more particularly in the range from 0.1 to 3.0 cm$^3$/g, and preferably in the range from 0.2 to 2.0 cm/g. The proportion of pores having pore diameters ≤75 Å can preferably be as least 65%, more particularly at least 70% and preferably at least 75%.

Preferably used adsorbent particles having the aforementioned properties, more particularly based on spherical, activated carbon, are available from Blücher GmbH, Erkrath, Germany or from Adsor-Tech GmbH, Premhits, Germany.

As mentioned, the adsorptive structures used according to the present invention and/or the agglomerates forming said structures can be processed into an adsorptive molded part according to the present invention, which can be done via compression molding in particular.

It is a particular advantage of the adsorptive structures used according to the present invention that they—both in the form of a loose bed and in the form of a molded part—have a distinctly reduced pressure drop compared with a loose bed of individual adsorptive particles, as mentioned.

The present invention thus makes it possible to convert granular or spherical adsorbents or adsorbent particles, but also other forms of adsorbents, with the assistance of organic polymers, more particularly binders or hot-melt adhesives, into agglomerates which, in a loose bed but also when compression molded into an adsorptive molded part, have a very low differential pressure, especially compared with, for example, loose beds of comparable granular or spherical adsorbents or adsorbent particles or splint coal. The adsorptive agglomerates used according to the present invention and the adsorptive molded parts according to the present invention which are obtainable therefrom by compression molding in particular are therefore particularly useful in applications where both a low differential pressure and a low initial breakthrough are crucial.

The present invention is accordingly associated with a multiplicity of advantages, of which only some are mentioned above and some further are hereinbelow enumerated in a nonlimiting and nonconclusive manner:

As mentioned, the adsorptive structures or agglomerates used according to the present invention have—not only in the form of a loose bed but also when compression molded into an adsorptive molded part according to the present invention—a distinctly reduced differential pressure compared with purely base adsorbent particles without other adsorption properties, for example adsorption kinetics, adsorption capacity, initial breakthrough or the like, being impaired.

The adsorptive structures or agglomerates used according to the present invention further combine good mechanical stabilities with good flexibility and compressibility, so that the adsorptive structures or agglomerates used according to the present invention are readily compression moldable and processable into corresponding stable and self-supporting adsorptive molded parts of any desired geometry, as described in detail hereinbelow.

The adsorptive structures or agglomerates used according to the present invention provide a very high degree of activation and hence a very high capacity on the part of the base adsorbent particles coupled with very good mechanical stability; agglomerate formation does not involve any significant reduction in mechanical stability, compared with the nonagglomerated base adsorbent particles, and this at very high retained degrees of activation, as is the case for the nonagglomerated base adsorbent particles.

The adsorptive structures or agglomerates used according to the present invention also provide a high total adsorption efficiency even at low adsorbate concentrations due to very high possible adsorption potentials on the part of the base adsorbent particles.

Owing to the very pure surfaces of the base adsorbent particles, high relative humidities are not observed to result in significant drops in efficiency.

Owing to the high hardness of the base adsorbent particles under abrasion, attrition and loading, the adsorptive structures agglomerates used according to the present invention and the adsorptive molded pares according to the present invention which are obtainable therefrom are at least substantially dustless and more particularly contain at least substantially no respiratory dust particle sizes.

In addition, the adsorptive structures or agglomerates used according to the present invention retain the excellent impregnability of the base particles (more than 60% in the wetting test, for example).

In addition, a high broad-spectrum efficacy of adsorption is achieved through an efficient pore size distribution (combination of very high micro- and meso/macropore volumes, for example) adjustable in the course of the manufacturing operation of the base adsorbent particles, as well as very good impregnability on the part of the base adsorbent particles. The adsorptive structures or agglomerates used according to the present invention make it possible for example to combine adsorbent particles having different pore size distributions with each other within a single agglomerate, distinctly improving the broad-spectrum efficacy of adsorption.

The pressure drop is freely adjustable via free choice of the agglomerate fraction in the range of the base adsorbent particle diameters up to the agglomerate diameters.

As mentioned, a distinctly lower pressure drop is observed not only for a loose bed of the adsorptive structures or agglomerates used according to the present invention but also for the adsorptive molded parts according to the present invention which are obtainable therefrom by compression molding compared with granular or molded activated carbons at the same adsorption capacity.

The overall adsorption efficiency and the overall adsorption kinetics are adjustable/controllable via free choice of the base adsorbent particle size (alterable surface/volume ratio, for example) and via free choice of the degree of base adsorbent particle activation (alterable pore size distribution, for example).

Similarly, bed bulk density and capacity for a given pressure drop are adjustable for example via free choice of the base adsorbent particle size (alterable surface/volume ratio, for example).

The high buffer volume compensates any reduced adsorption due to the organic polymeric constituents, more particularly hot-melt adhesive constituents, and so there is no significant to no blocked pore volume due to the organic polymeric constituents. Any capacity loss due to the constituents of the organic polymer is extremely small.

The present invention further provides—in accordance with a second aspect of the present invention—a process for producing an adsorptive molded part according to the present invention, more particularly an adsorptive molded part as described above, wherein adsorptive structures based on agglomerates of adsorbent particles, more particularly as described above, are compression molded in the course of this process. Typically, compression molding is effected by heating, preferably by heating to temperatures below the melting or softening temperature of the organic polymer. Typically, the compression molding is effected by simultaneous shaping.

The adsorptive structures which are used according to the present invention and which are based on agglomerates of adsorbent particles are obtainable via a multistage process, wherein this multistage production process for the adsorptive structures comprises a) first granular, preferably spherical adsorbent particles on the one hand and particles of preferably thermoplastic organic polymer, more particularly binder, on the other being brought into contact and mixed, b) then heating the resulting mixture to temperatures above the melting or softening temperature of she organic polymer, and c) finally cooling the resulting product to temperatures below the melting or softening temperature of the organic polymer.

Typically, step b) comprises maintaining the attained temperature for a defined period, more particularly for at least one minute, preferably as least 5 minutes, preferably at least 10 minutes. Typically, the attained temperature is maintained for a period in the range from 1 to 600 minutes, more particularly in the range from 5 to 300 minutes and preferably in the range from 10 to 150 minutes. The criterion for determining the maintaining time is that the entire batch is brought to a unitary temperature and all the organic polymer, more particularly all the hot-melt adhesive, has completely melted.

In general, during the performance of step b), more particularly in the course of the aforementioned heating and/or maintaining operation, an energy input, preferably via mixing, takes place, more particularly wherein the energy input is used to control the resulting agglomerate size, in which case a small agglomerate size is obtained with increasing energy input.

Typically, the process for producing the adsorptive structures used according to the present invention is performed in a heatable rotary tube, more particularly a rotary tube oven. The rotary speed of the rotary tube is used so control particularly the energy inputment and thus the resulting agglomerate size; increasingly smaller agglomerate sizes are obtainable with increasing rotary speed. Batchwise emptying of the rotary tube then makes it possible to obtain altogether multimodal agglomerate size distributions by varying the rotary speeds for the individual batches.

As mentioned, the agglomerates resulting in step c) are then processed in a final step into an adsorptive molded part according to the present invention, which can be done by compression molding in particular. The processing into molded parts can advantageously be effected by heating, in which case it is preferable to set temperatures below the melting or softening temperature of the organic polymer, more particularly of the hot-melt adhesive, so that the agglomerates concerned are not decomposed and/or do not disintegrate.

In the realm of the multistage production process for the adsorptive structures or agglomerates used according to the present invention, the thermoplastic organic polymer, more particularly binder, preferably hot-melt adhesive, is typically used in the form of particles, more particularly granular or spherical particles, preferably in the form of particles solid at room temperature and atmospheric pressure. The organic polymer can typically be used with particle sizes in the range from 100 to 2000 μm, more particularly in the range from 150 to 1500 μm and preferably in the range from 200 to 1000 μm. Inc size ratio of organic polymer particles to adsorbent particles can typically be chosen at not less than 1:1, more particularly at not less than 1.25:1, preferably at not less than 1.5:1, more preferably at not less than 2:1 and even more preferably at not less than 3:1.

In the realm of the multistage production process for the adsorptive structures or agglomerates used according to the present invention, the weight ratio of adsorbent particles to organic polymer may typically be at least 2:1, more particularly at least 3:1, preferably at least 5:1, more preferably at least 7:1 and even more preferably at least 8:1. The weight ratio of adsorbent particles to organic polymer typically varies in the range from 2:1 to 30:1, more particularly in the range from 3:1 to 20:1, preferably in the range from 4:1 to 15:1 and more preferably in the range from 5:1 to 10:1.

As mentioned, the organic polymer used is a preferably thermoplastic binder, more particularly at preferably thermoplastic hot-melt adhesive, preferably based on polymers from the group of polyesters, polyamides, polyethers, polyetheresters and/or polyurethanes and their mixtures and copolymers.

In a typical embodiment of the present invention, the following procedure can be adopted for example:

The organic polymer used, as mentioned, typically comprises hot-melt adhesives, preferably in the form of so-called powder adhesives, in which case a multiplicity of adhesives can be used. Typical particle sizes for the adhesives used vary in the range from 200 to 1000 µm. It is preferable to use adhesives of high thermal and chemical stability.

Particular preference is given to using thermoplastic adhesives, more particularly hot-melt, adhesives. It is possible to use adhesives having polyester, polyamide or polyurethane hard segments, which may also contain soft segments, in which case the soft segments can be selected from the classes of the (poly)ethers and (poly)esters. The typical polymer designations are then, for example, copolyesters or specific polyetherester.

As mentioned, the hot-melt adhesives are preferably used in powder form. The particle size distribution of the adhesives should be greater than the particle size distribution of the base adsorbent particles in order that a downward descent of adhesive constituents in the bed is prevented.

As mentioned, the powder adhesive particles on the one hand and the base adsorbent particles on the other can then be initially charged to a rotary tube and intensively mixed therein and the mixture heated above the softening or melting temperature of the adhesive and maintained for a defined period at that temperature. The thermal treatment is dependent on the particular adhesive used. Mechanical treatment, more particularly the rotary speed of the rotary tube, can be used to influence the resulting size of agglomerate.

Agglomeration depends on the type of adhesive used. As mentioned, any desired adhesives can be used in principle. The target temperature should be greater than or within the melting or softening temperature range of the adhesive.

Care should further be taken to ensure that a dumped had be heated to the target temperature in the course of the process, and that appropriate defined maintaining times be used in order that complete heating of the entire dumped bed may be achieved.

The target temperature should be chosen as low as possible, since any further temperature elevation and thus any further reduction in the viscosity of the adhesive, once the melting or softening temperature of the present adhesive is reached, would lead to an increased and thus undesired pore blocking of the adsorbent particles.

The mechanical treatment, more particularly the rotary speed of the rotary tube reactor, depends on the desired agglomerate size distribution. Elevated rotary speed can be used to exert a defined influence on she agglomerate size distribution. An elevated rotary speed leads to a smaller agglomerate size distribution.

Finally, as mentioned, the adsorptive structures obtained in this way on the basis of agglomerates of adsorbent particles are compression molded into an adsorptive molded part according to the present invention, for which the compression molding is typically carried out with heating, preferably heating to temperatures below the melting or softening temperature of the organic polymer, and typically with simultaneous shaping, as mentioned.

For further details concerning the present invention production process for the present invention adsorptive molded part, reference can be made to the above observations concerning the present invention adsorptive molded part as such, which apply mutatis mutandis in respect of the present invention production process.

The present invention further provides—in accordance with a third aspect of the present invention—the present invention use of the adsorptive molded part according to the present invention.

The adsorptive molded part according to the present invention can be used for the adsorption of toxics, noxiants and odors, more particularly from gas or air streams or alternatively from liquids, more particularly water.

The adsorptive molded part of the present invention can further be used for cleaning or purifying gases, gas screams or gas mixtures, more particularly air, or liquids, more particularly water.

The adsorptive molded part of the present invention can further be used in adsorption filters.

The adsorptive molded part of the present invention can similarly be used in the manufacture of filters, more particularly adsorption filters.

The adsorptive molded part of the present invention can finally be used as a sorption store for gases, more particularly hydrogen.

For further details concerning the present invention use of the adsorptive molded part according to the present invention, reference can be made to the above observations concerning the other aspects of the invention because they apply mutatis mutandis in respect of this aspect of the present invention.

The present invention finally further provides—in accordance with a fourth aspect of the present invention—a filter comprising an adsorptive molded part according to the present invention.

More particularly, the filter has a length-based pressure drop at a flow rate of 0.2 m/s of at most 200 Pa/cm and more particularly in the range from 5 to 200 Pa/cm.

Advantageously, the filter of the present invention has length-based pressure drop at a flow rate of 0.2 m/s of at most 150 Pa/cm, preferably at most 100 Pa/cm, more preferably at most 90 Pa/cm, even more preferably at most 70 Pa/cm and vet even more preferably at most 50 Pa/cm.

Typically, the filter of the present invention has a length-based pressure drop at a flow rate of 0.2 m/s in the range from 5 to 150 Pa/cm, preferably in the range from 5 to 100 Pa/cm, more preferably in the range from 7.5 to 90 Pa/cm and even more preferably in the range from 10 to 80 Pa/cm.

For further details concerning the filter of the present invention, reference can be made to the above observations concerning the other aspects of the present invention because they apply mutatis mutandis in respect of this aspect of the present invention.

Further advantageous properties, aspects and features of the present invention will be apparent from the following description of exemplary embodiments illustrated herein.

Further elaborations, modifications and variations of the present invention will be readily apparent to and realizable by the ordinarily skilled on reading the description without their having to go outside the realm of the present invention.

The present invention is illustrated by the following exemplary embodiments which, however, shall in no way limit the present invention.

Exemplary Embodiments

The production of adsorptive structures based on agglomerates of adsorbent particles and also of adsorptive molded parts according to the present invention which are obtainable therefrom will now be described.

The production of the adsorptive structures or agglomerates proceeds by spherical adsorbent particles based on activated carbon (obtainable for example from Blücher GmbH, Erkrath, Germany or from Adsor-Tech GmbH, Premniuz, Germany) on the one hand being first brought into contact with each other and thermoplastic hot-melt adhesive particles, generally with particle sizes in the range from 200 to 1000 µm (for example copolyester hot-melt adhesives from EMS-Chemie AG, EMS-GRILTECH, Switzerland) on the other being brought into contact with each other and mixed in a rotary tube and subsequently heated therein above the melting or softening temperature of the hot-melt adhesive concerned and maintained therein at this temperature for a defined period, and finally the resulting product being cooled down below the melting or softening temperature of the hot-melt adhesive concerned. Hot-melt adhesives suitable for the purposes of the present invention have for example the following properties: melting range: 118 to 123° C., melt viscosity: 350 mPas, lamination temperature: 120 to 150° C., heat resistant to 100° C., wash resistant to 75° C.

The process is carried out in a heatable rotary tube by controlling the energy input and thus the resulting size of agglomerate via the rotary speed of the rotary tube.

Figure 2:
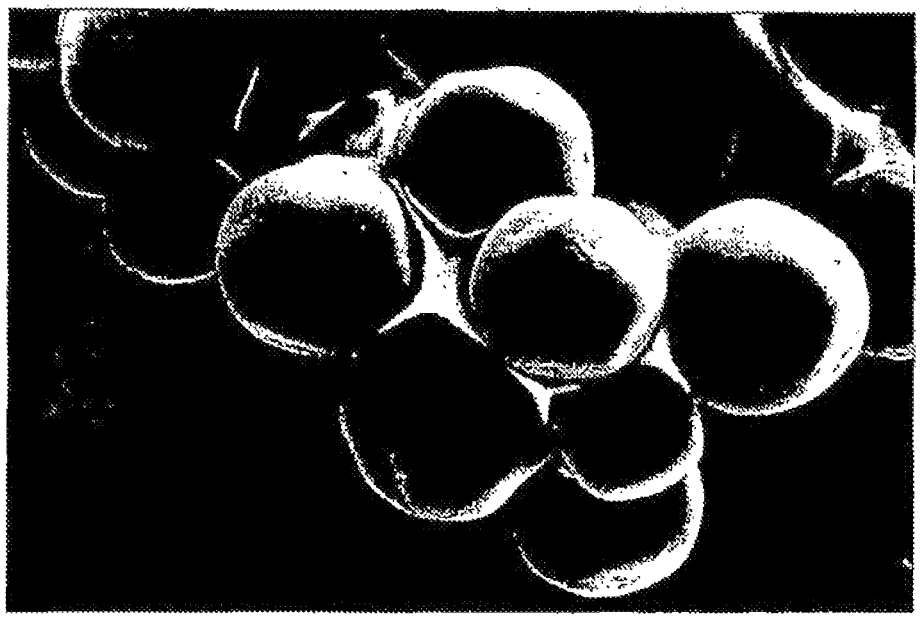
FIG. 2 provides a 200-fold microscopic magnification of an adsorptive structure which is based on an agglomerate of adsorbent particles and which is used according to the present invention.
Figure 3:
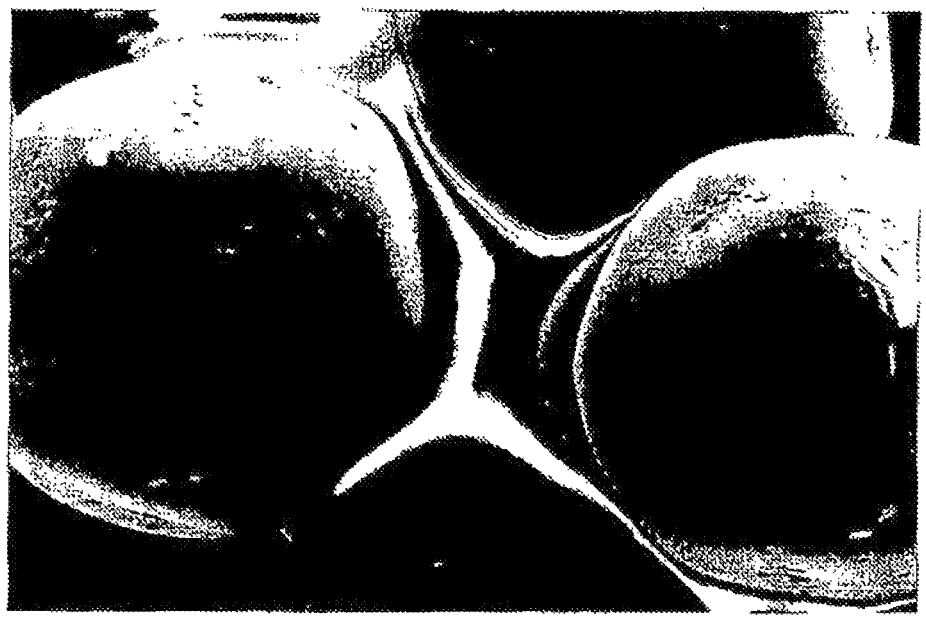
FIG. 3 provides a 500-fold microscopic magnification of an adsorptive structure which is based on an agglomerate of adsorbent particles and which is used according to the present invention.
Figure 10:
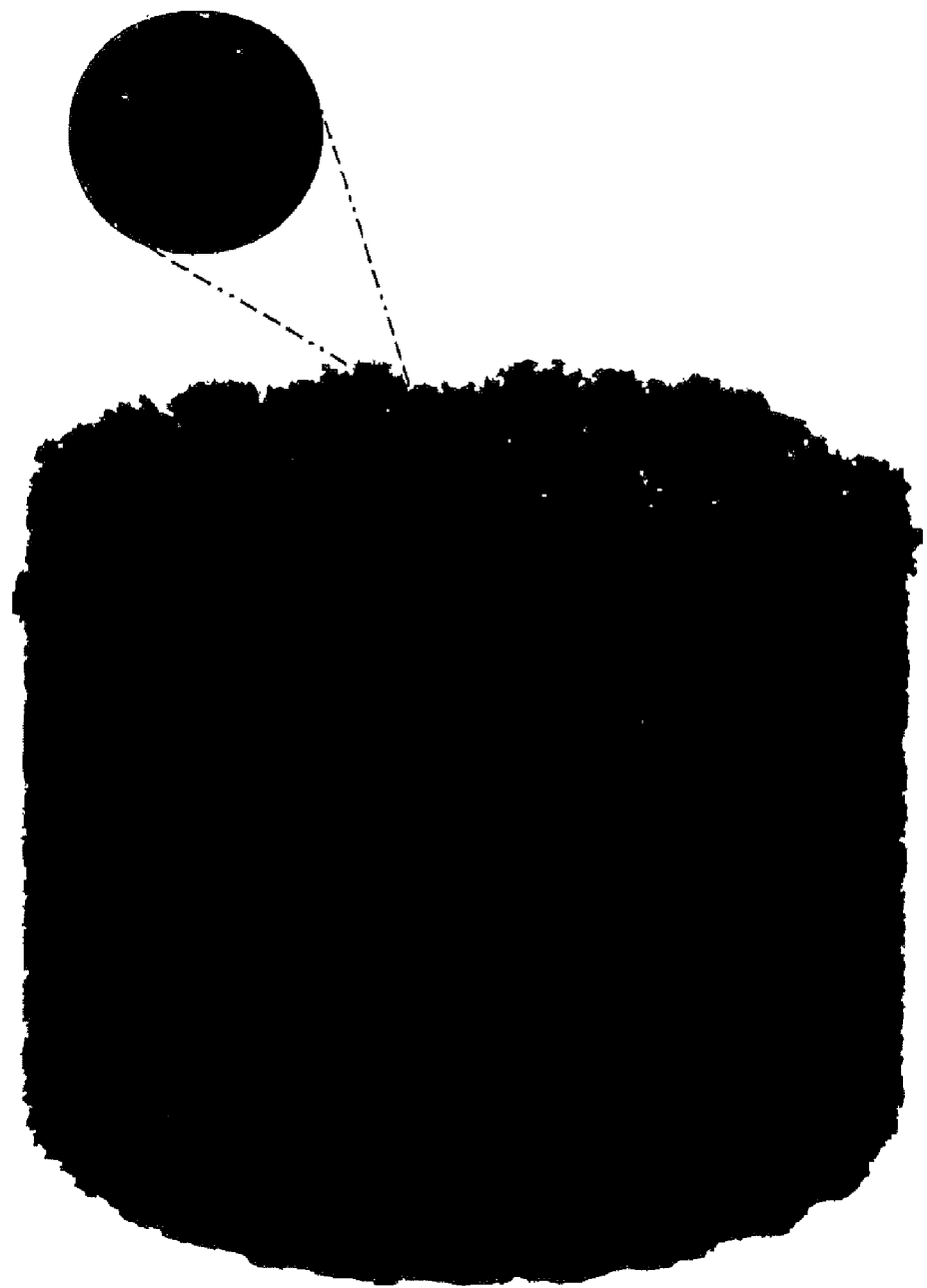
FIG. 10 provides a different geometric shape of adsorptive molded parts of the present invention, which are obtained by compression molding from adsorptive structures used according to the present invention.
Figure 11:
FIG. 11 provides a different geometric shape of adsorptive molded parts of the present invention, which are obtained by compression molding from adsorptive structures used according so the present invention.
Figure 12:
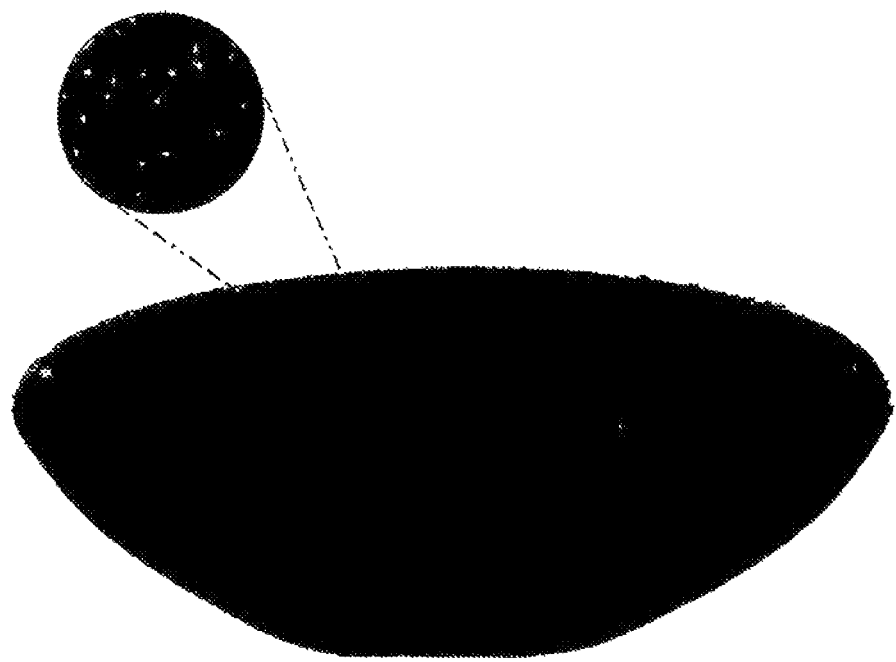
FIG. 12 provides a different geometric shape of adsorptive molded parts of the present invention, which are obtained by compression molding from adsorptive structures used according to the present invention.

The resulting agglomerates are subsequently analyzed and assessed. Relevant examples of the adsorptive structures are shown in FIGS. 1 to 3. The adsorptive structures agglomerates obtained in this way are subsequently processed into adsorptive molded parts according to the present invention, by compression molding with simultaneous shaping by heating below the melting or softening temperature of the hot-melt adhesive concerned. Adsorptive molded parts according to the present invention result. Relevant examples are depicted in FIGS. 10 to 12.

Exemplary Production of Agglomerates 1

Starting Materials:

base adsorbent particles; spherical activated carbon, polydisperse, fine, grain size <0.315 mm thermoplastic hot-melt adhesive, grain size 200 to 1000 µm
adhesive use ratio by weight: 1:5 (adhesive:base particles)

target temperature: T=175° C.

maintaining time on attainment of target temperature: t=30 min rotary tube reactor rotary speed: n=1 rpm The table which follows reports the weight-specific adhesive content and the weight-specific butane adsorption by way of example in respect of the agglomerates formed. The example test is carried out redundantly.

TABLE 1 weight-specific adhesive content, weight-specific butane adsorption (BA adsorption)

| Sample | Adhesive constituents [%] | BA adsorption [%] |
|---|---|---|
| Example 1 | 12.0 | 25.7 |
| Example 2 | 12.1 | 25.6 |

The agglomerates formed are divided into the following sieve fractions:
0.6-1.0 mm (agglomerates I)
0.8-1.25 mm (agglomerates II)
1.25-2.5 mm (agglomerates III)

Table 2 hereinbelow reports by way of example values determined on the sieved-off agglomerates.

TABLE 2 values determined on sieved-off agglomerates

| Fraction tested [mm] | Pressure drop per length (v = 0.2 m/s) [Pa/cm] | Bed density with adhesive constituents [g/l] | Adhesive constituents (%) | Bed density without adhesive constituents [g/l] |
|---|---|---|---|---|
| 0.6-1.0 | 62 | 442 | 11.2 | 392 |
| 0.6-1.0 | 69 | 462 | 11.2 | 410 |
| 0.8-1.25 | 40 | 411 | 11.6 | 363 |
| 0.8-1.25 | 40 | 409 | 11.6 | 362 |
| 1.25-2.5 | 15 | 329 | 12.7 | 287 |
| 1.25-2.5 | 16 | 317 | 12.7 | 277 |

Figure 4:
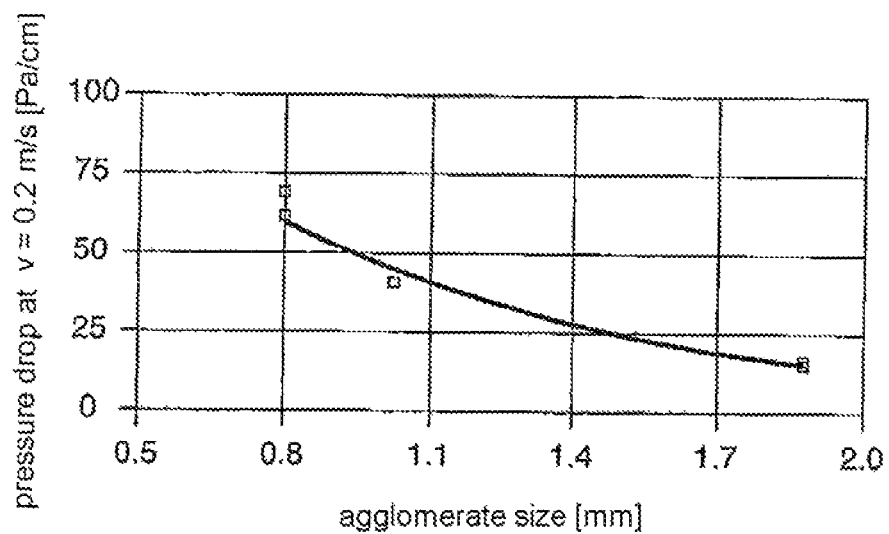
FIG. 4 provides a graphic illustration of the dependency of the length-based pressure drop in [Pa/cm] at a flow rate of 0.2 m/s on the agglomerate size in [mm] of various adsorptive structures used according to the present invention.
Figure 5:
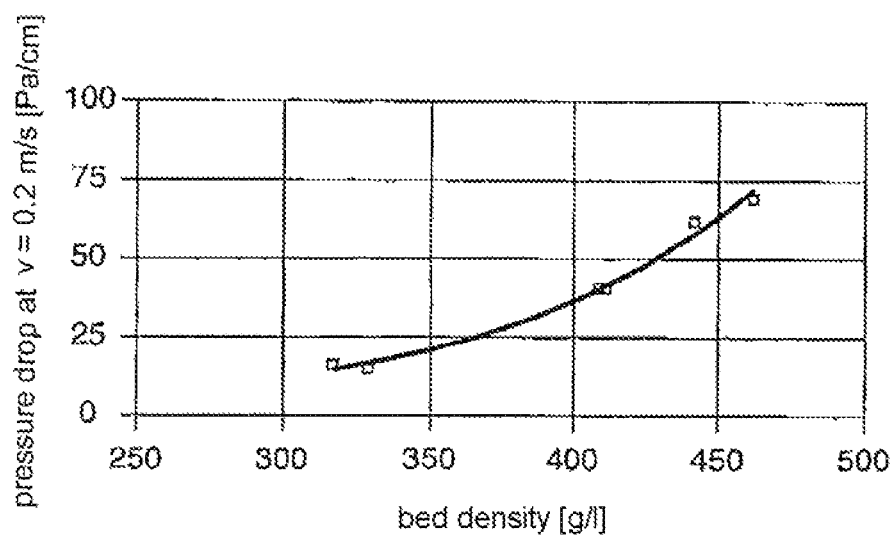
FIG. 5 provides a graphic illustration of the dependency of the length-based pressure drop in [Pa/cm] at a flow rate of 0.2 m/s on the bed bulk density in [g/l] of various adsorptive structures used according to the present invention.
Figure 6:
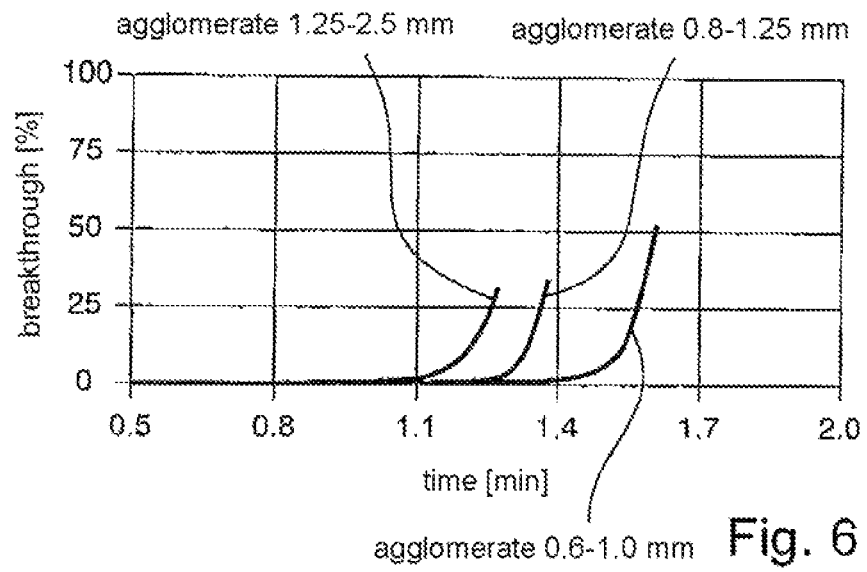
FIG. 6 provides time-dependent breakthrough curves of beds of various, adsorptive structures used according to the present invention as a function of the agglomerate size.

The diagrams as per FIGS. 4 and 5 are exemplary illustrations of the course of pressure drop against agglomerate size (FIG. 4) and of the course of pressure drop against bulk density with adhesive constituents (FIG. 5). The diagram as per FIG. 6 is an exemplary illustration of breakthrough curves (toluene) of various agglomerates differing in size (flow rate: v=0.1 m/s; initial concentration c=80 ppm of toluene; relative humidity 50%; temperature T=23° C.; bed height h=20 mm).

Table 3 hereinbelow shows measured results and parameters of the breakthrough curves compared with conventional activated carbon filters by way of example. Beds of agglomerates differing in agglomerate size (agglomerated base adsorbent particles of <0.315 mm) are compared with beds of conventional activated carbon particles (comparative example; particle size: 0.8 to 1.7 mm).

TABLE 3 measured results and parameters of breakthrough curves compared with conventional activated carbon filters

| Sample | Agglomerate I | Agglomerate II | Agglomerate III | Conventional activated carbon filter (comparator) |
|---|---|---|---|---|
| size [mm] | 0.6-1.0 | 0.8-1.25 | 1.25-2.5 | 0.8-1.7 |
| bed height [mm] | 20.0 | 20.0 | 20.0 | 20.0 |
| bed diameter [mm] | 50.0 | 50.0 | 50.0 | 50.0 |
| bed volume [ml] | 39.3 | 39.3 | 39.3 | 39.3 |
| bed weight [g] | 17.9 | 16.1 | 12.9 | 21.9 |
| bed density [g/cm$^3$] | 0.5 | 0.4 | 0.3 | 0.6 |
| toluene concentration [ppm] | 79.4 | 79.8 | 79.3 | 80.2 |

TABLE 3-continued measured results and parameters of breakthrough curves compared with conventional activated carbon filters

| Sample | Agglomerate I | Agglomerate II | Agglomerate III | Conventional activated carbon filter (comparator) |
|---|---|---|---|---|
| temperature [° C.] | 23.0 | 23.2 | 23.2 | 22.7 |
| rel. humidity [%] | 49.9 | 49.9 | 49.9 | 49.9 |
| flow rate (target value) [m/s] | 0.1 | 0.1 | 0.1 | 0.1 |
| pressure drop [Pa] | 53.8 | 33.2 | 9.1 | 58.0 |
| breakthrough [%]/time [min] | | | | |
| 1 | 0.1 | 0.0 | 0.0 | 0.0 |
| 5 | 0.1 | 0.0 | 0.0 | 0.0 |
| 10 | 0.1 | 0.0 | 0.0 | 0.0 |
| 30 | 0.1 | 0.1 | 0.1 | 0.0 |
| 60 | 0.1 | 0.1 | 0.1 | 0.1 |
| 120 | 0.1 | 0.1 | 0.1 | 0.1 |
| 180 | 0.1 | 0.1 | 0.1 | 0.1 |
| 240 | 0.1 | 0.1 | 0.1 | 0.1 |
| 360 | 0.1 | 0.1 | 0.2 | 0.1 |
| 600 | 0.1 | 0.1 | 0.4 | 0.2 |
| 900 | 0.3 | 0.5 | 1.1 | 0.7 |
| 1200 | 0.8 | 1.2 | 13.3 | 18.8 |
| time [min] to breakthrough [%] | | | | |
| 5 | 1649.3 | 1344.0 | 1100.5 | 1084.3 |
| 10 | 1715.7 | 1385.1 | 1172.3 | 1150.3 |
| 30 | 1799.3 | 1460.7 | 1286.3 | 1230.9 |

Exemplary Production of Agglomerates 2
Starting Materials:
  base adsorbent particles; spherical activated carbon, polydisperse, course, grain size 0.56-0.71 mm
  thermoplastic hot-melt adhesive, grain size 500 to 1000 μm
  adhesive use ratio by weight: 1:10 (adhesive:base particles)
  target temperature: T=175° C.
  maintaining time on attainment of target temperature: t=30 min
  rotary tube reactor rotary speed: n=1 rpm The table which follows reports the weight-specific adhesive content and the weight-specific butane adsorption by way of example in respect of the agglomerates formed. The example test is carried out redundantly.

TABLE 4 weight-specific adhesive content, weight-specific butane adsorption (BA adsorption)

| Sample | Adhesive constituents [%] | BA adsorption [%] |
|---|---|---|
| Example 1 | 6.8 | 30.7 |
| Example 2 | 4.8 | 32.4 |

The agglomerates formed are divided into the following sieve fractions:
  0.8-1.25 mm (agglomerates I')
  1.25-2.5 mm (agglomerates I")
  2.5-5.0 mm (agglomerates I''')

Table 5 hereinbelow reports by way of example values determined on the sieved-off agglomerates.

TABLE 5 values determined on sieved-off agglomerates

| Fraction tested [mm] | Pressure drop per length (v = 0.20 m/s) [Pa/cm] | Bed density with adhesive constituents [g/l] | Adhesive constituents (%) | Bed density without adhesive constituents [g/l] |
|---|---|---|---|---|
| 0.8-1.25 | 55 | 485 | 2.7 | 472 |
| 0.8-1.25 | 64 | 482 | 2.7 | 469 |
| 1.25-25 | 20 | 384 | 4.6 | 366 |
| 1.25-25 | 21 | 392 | 4.6 | 374 |
| 2.5-5.0 | 9 | 290 | 5.6 | 274 |
| 2.5-5.0 | 9 | 290 | 5.6 | 274 |

Figure 7:
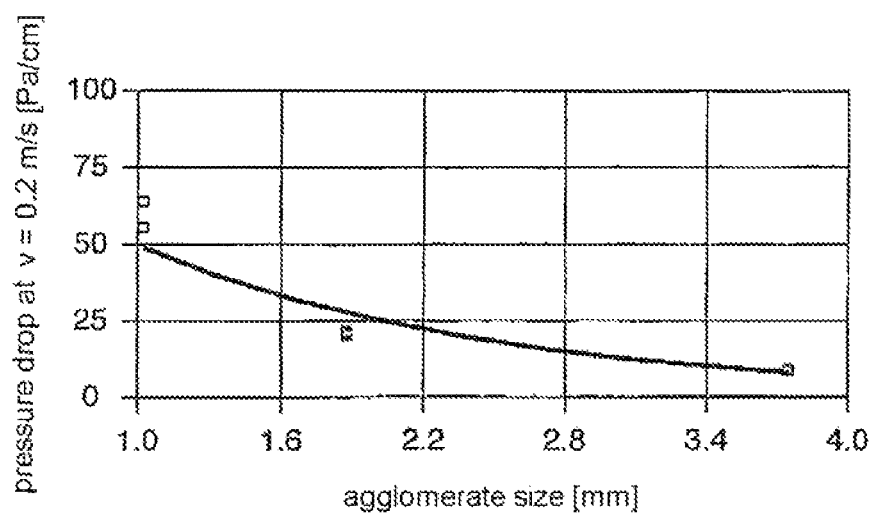
FIG. 7 provides a graphic illustration of the dependency of the length-based pressure drop in [Pa/cm] at a flow rate of 0.2 m/s on the agglomerate size in [mm] of various, adsorptive structures used according to the present invention.

The diagrams as per FIGS. 6 and 7 are exemplary illustrations of the course of pressure drop against agglomerate size (FIG. 6) and of the course of pressure drop against bulk density with adhesive constituents (FIG. 7).

Figure 8:
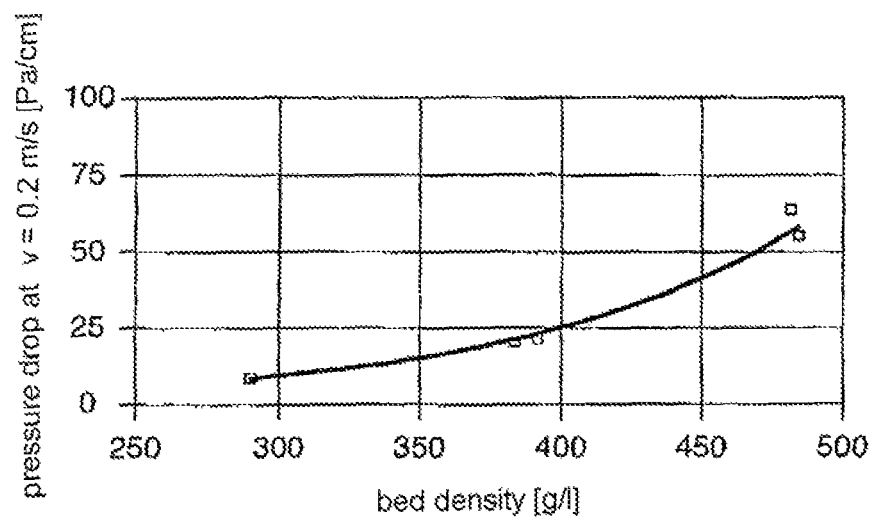
FIG. 8 provides a graphic illustration of the dependency of the length-based pressure drop in [Pa/cm] at a flow rate of 0.2 m/s on the bed bulk density in [g/l] of various adsorptive structures used according to the present invention.
Figure 9:
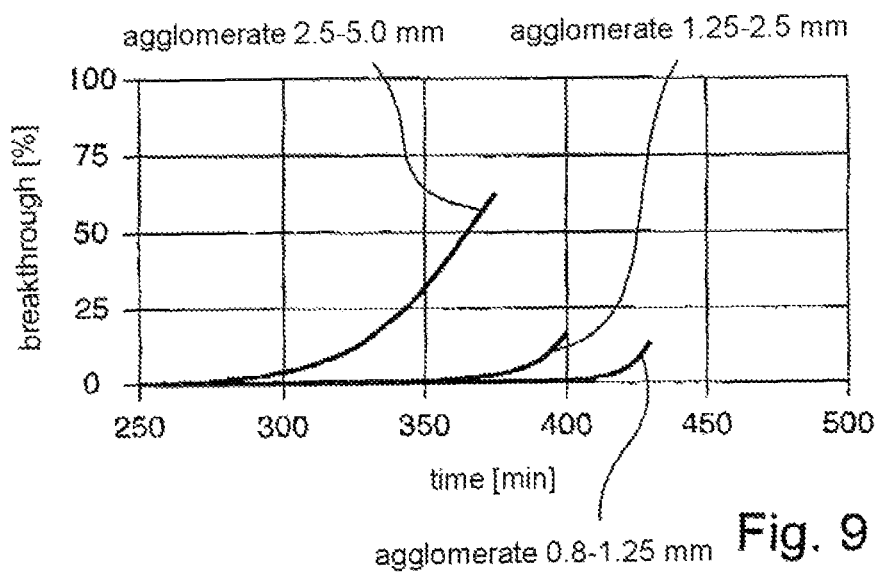
FIG. 9 provides time-dependent breakthrough curves of beds of various adsorptive structures used according to the present invention as a function of the agglomerate size.

The diagram as per FIG. 8 is an exemplary illustration of breakthrough curves (toluene) of various agglomerates differing in size (flow rate: v=0.1 m/s; initial concentration c=80 ppm of toluene; relative humidity 50%; temperature T=23° C.; bed height h=20 mm).

Table 6 hereinbelow shows measured results and parameters of the breakthrough curves compared with conventional activated carbon filters by way of example. Beds of agglomerates differing in agglomerate size (agglomerated base adsorbent particles of 0.56-0.71 mm) are compared with beds of conventional activated carbon particles (comparative example; particle size: 0.8 to 1.7 mm).

TABLE 6 measured results and parameters of breakthrough curves compared with conventional activated carbon filters

| Sample | Agglomerate I' | Agglomerate II' | Agglomerate III' | Conventional activated carbon filter (comparator) |
|---|---|---|---|---|
| size [mm] | 0.8-1.25 | 1.25-2.5 | 2.5-5.0 | 0.8-1.7 mm |
| bed height [mm] | 20.0 | 20.0 | 20.0 | 20.0 |
| bed diameter [mm] | 50.0 | 50.0 | 50.0 | 50.0 |
| bed volume [ml] | 39.3 | 39.3 | 39.3 | 39.3 |
| bed weight [g] | 19.0 | 15.1 | 11.4 | 21.9 |
| bed density [g/cm³] | 0.5 | 0.4 | 0.3 | 0.6 |
| toluene concentration [ppm] | 79.4 | 81.9 | 80.2 | 80.2 |
| temperature [° C.] | 22.9 | 22.9 | 22.7 | 22.7 |
| rel. humidity [%] | 49.9 | 49.9 | 49.9 | 49.9 |
| flow rate (target value) [m/s] | 0.1 | 0.1 | 0.1 | 0/1 |
| pressure drop [Pa] | 39.5 | 10.7 | 3.1 | 58.0 |
| breakthrough [%]/time [min] | | | | |
| 1 | 0.0 | 0.0 | 0.4 | 0.0 |
| 5 | 0.0 | 0.0 | 0.4 | 0.0 |
| 10 | 0.0 | 0.0 | 0.4 | 0.0 |
| 30 | 0.0 | 0.0 | 0.4 | 0.0 |
| 60 | 0.0 | 0.0 | 0.5 | 0.1 |
| 120 | 0.0 | 0.0 | 0.7 | 0.1 |

TABLE 6-continued measured results and parameters of breakthrough
curves compared with conventional activated carbon filters

| Sample | Agglomerate I' | Agglomerate II' | Agglomerate III' | Conventional activated carbon filter (comparator) |
|---|---|---|---|---|
| 180 | 0.0 | 0.0 | 0.9 | 0.1 |
| 240 | 0.0 | 0.0 | 1.2 | 0.1 |
| 360 | 0.0 | 0.1 | 2.1 | 0.1 |
| 600 | 0.1 | 0.2 | 6.0 | 0.2 |
| 900 | 0.1 | 0.6 | 21.9 | 0.7 |
| 1200 | 0.3 | 2.2 | 56.2 | 18.8 |
| time [min] to breakthrough [%] | | | | |
| 5 | 1718.5 | 1347.6 | 561.7 | 1084.3 |
| 10 | 1774.3 | 1440.1 | 714.3 | 1150.3 |
| 30 | 1875.5 | 1582.5 | 984.7 | 1230.9 |

The invention claimed is:

1. An adsorptive molded part, wherein the molded part is constructed from a multiplicity of adsorptive structures based on agglomerates of adsorbent particles, wherein the individual agglomerates of adsorbent particles of the adsorptive structures each comprise a multiplicity of granular adsorbent particles, wherein the adsorbent particles of an individual agglomerate are bound together via a thermoplastic organic polymer, wherein the organic polymer forms at least one core of the particular agglomerate and wherein the adsorbent particles of an individual agglomerate are each disposed and/or lodged at one or more core of organic polymer, wherein the size ratio of core of organic polymer to individual adsorbent particle is at least 1.25:1, wherein the molded part is obtained by compression molding the adsorptive structures based on agglomerates of adsorbent particles, wherein the compression molding is effected by heating to temperatures below the melting or softening temperature of the organic polymer and by simultaneously shaping, and wherein the molded part is in cylindrical, rod-shaped, plate-shaped, tube-shaped or polyhedral form.

2. The adsorptive molded part according to claim 1, wherein the molded part is in one-piece or monolithic form.

3. The adsorptive molded part according to claim 1, wherein the individual agglomerates may each comprise one or more cores of organic polymer.

4. The adsorptive molded part according to claim 1, wherein the core of organic polymer has a size in the range from 100 to 2,000 µm.

5. The adsorptive molded part according to claim 1, wherein the size ratio of core of organic polymer to individual adsorbent particle is at least 1.5:1.

6. The adsorptive molded part according to claim 1, wherein the individual agglomerates each comprise from at least 5 adsorbent particles up to 100 adsorbent particles.

7. The adsorptive molded part according to claim 1, wherein the individual agglomerates each have a weight ratio of adsorbent particles to organic polymer per agglomerate in the range from 2:1 to 30:1.

8. The adsorptive molded part according to claim 1, wherein the individual agglomerates are in self-supporting form and wherein the individual agglomerates are in particle form, wherein the agglomerates have particle sizes in the range from 0.01 to 20 mm.

9. The adsorptive molded part according to claim 1, wherein the organic polymer is in thermoplastic form or in heat-tacky form.

10. The adsorptive molded part according to claim 1, wherein the organic polymer is selected among polymers selected from the group consisting of polyesters, polyamides, polyethers, polyetheresters and polyurethanes and also their mixtures and copolymers.

11. The adsorptive molded part according to claim 1, wherein the organic polymer is a thermoplastic hot-melt adhesive based on polymers selected from the group consisting of polyesters, polyamides, polyethers, polyetheresters and polyurethanes and also their mixtures and copolymers, wherein the hot-melt adhesive is solid at 25° C. and atmospheric pressure and has a melting or softening range above 100° C.

12. The adsorptive molded part according to claim 1, wherein the adsorbent particles of the individual agglomerates are covered or coated with organic polymer to at most 50% of their surface.

13. The adsorptive molded part according to claim 1, wherein the adsorbent particles have a porous structure.

14. The adsorptive molded part according to claim 1, wherein the adsorbent particles have particle sizes in the range from 0.001 to 3 mm.

15. The adsorptive molded part according to claim 1, wherein the adsorbent particles consist of a material selected from the group of activated carbon; zeolites; inorganic oxides; molecular sieves; mineral granulates; klathrates; metal-organic framework materials (MOFs) and also their mixtures.

16. The adsorptive molded part according to claim 1, wherein the adsorbent particles are formed from granular activated carbon.

17. The adsorptive molded part according to claim 1, wherein the adsorbent particles have a specific BET surface area from at least 500 m$^2$/g and up to 4,000 m$^2$/g.

18. A process for producing an adsorptive molded part according to claim 1, wherein the process comprises the following step:
    adsorptive structures based on agglomerates of adsorbent particles are compression molded to form an adsorptive molded part.

19. The process according to claim 18, wherein adsorptive structures based on agglomerates of adsorbent particles are produced by a multistage process by
    a) first granular adsorbent particles on the one hand and particles of thermoplastic organic polymer on the other being brought into contact and mixed,
    b) then heating the resulting mixture to temperatures above the melting or softening temperature of the organic polymer, and
    c) finally cooling the resulting product to temperatures below the melting or softening temperature of the organic polymer.

20. A filter comprising an adsorptive molded part, wherein the molded part is constructed from a multiplicity of adsorptive structures based on agglomerates of adsorbent particles, wherein the individual agglomerates of adsorbent particles of the adsorptive structures each comprise a multiplicity of granular adsorbent particles, wherein the adsorbent particles of an individual agglomerate are bound together via a thermoplastic organic polymer, wherein the organic polymer forms at least one core of the particular agglomerate and wherein the adsorbent particles of an individual agglomerate are each disposed and/or lodged at one or more core of organic polymer, wherein the size ratio of core of organic polymer to individual adsorbent particle is at least 1.25:1, wherein the molded part is obtained by compression molding the adsorptive structures based on agglomerates of adsorbent particles, wherein the compression molding is effected by heating to temperatures below the melting or softening temperature of the organic polymer and by simultaneously shaping, and wherein the molded part is in cylindrical, rod-shaped, plate-shaped, tube-shaped or polyhedral form.

* * * * *